Figure 1:
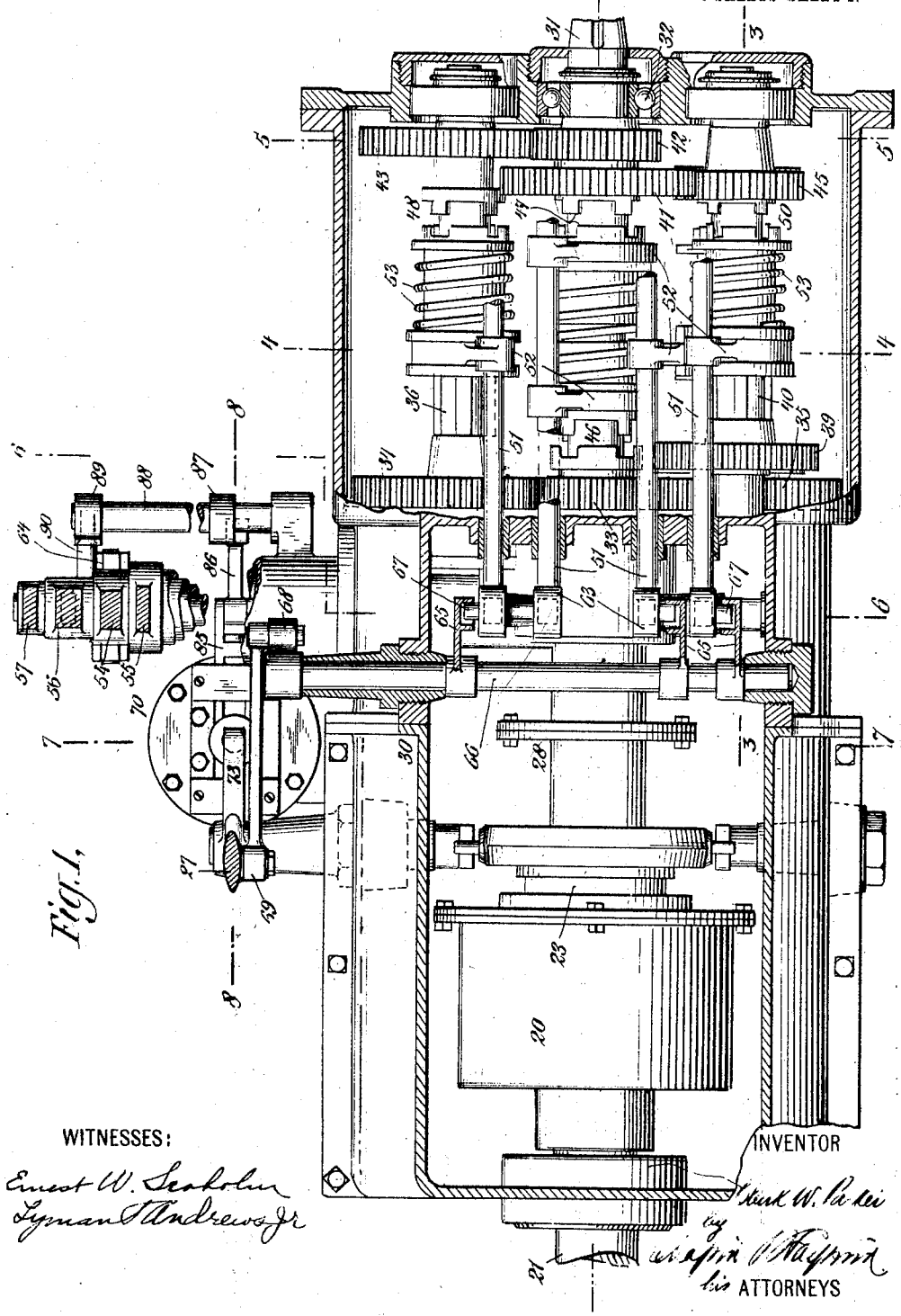

C. W. PARKER.
TRANSMISSION GEARING.
APPLICATION FILED JAN. 30, 1911.

1,042,960.

Patented Oct. 29, 1912.

6 SHEETS—SHEET 1.

WITNESSES:

INVENTOR

ATTORNEYS

C. W. PARKER.
TRANSMISSION GEARING.
APPLICATION FILED JAN. 30, 1911.

1,042,960.

Patented Oct. 29, 1912.
6 SHEETS—SHEET 2.

WITNESSES:

INVENTOR
Clark W. Parker
BY
his ATTORNEYS

C. W. PARKER.
TRANSMISSION GEARING.
APPLICATION FILED JAN. 30, 1911.
1,042,960.
Patented Oct. 29, 1912.
6 SHEETS—SHEET 3.
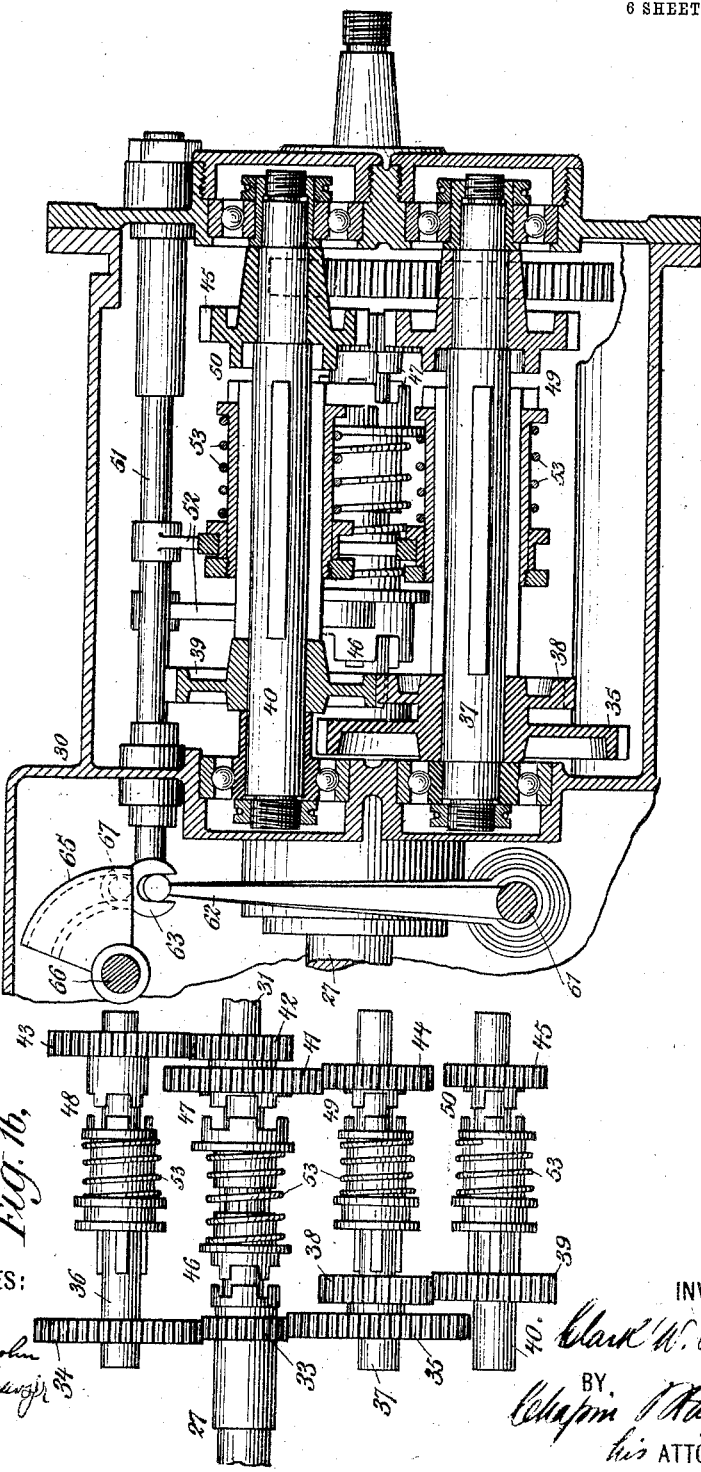
WITNESSES:
INVENTOR
BY
his ATTORNEYS C. W. PARKER.
TRANSMISSION GEARING.
APPLICATION FILED JAN. 30, 1911.
1,042,960.
Patented Oct. 29, 1912.
6 SHEETS—SHEET 4.
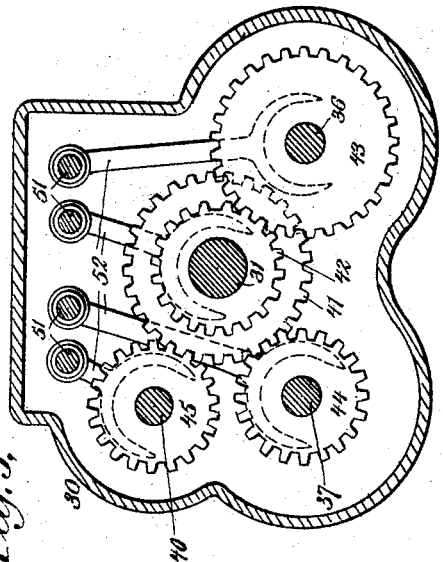
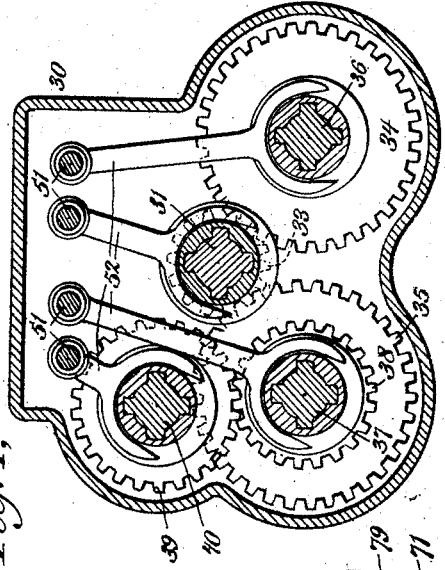
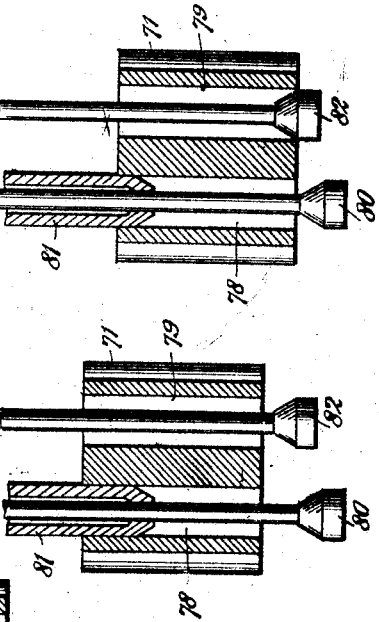
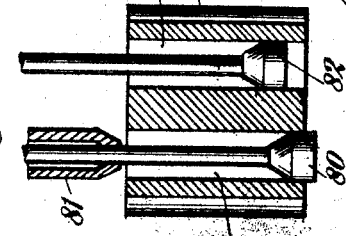
WITNESSES:
INVENTOR
Clark W. Parker
BY
his ATTORNEYS C. W. PARKER.
TRANSMISSION GEARING.
APPLICATION FILED JAN. 30, 1911.
1,042,960.
Patented Oct. 29, 1912.
6 SHEETS—SHEET 5.
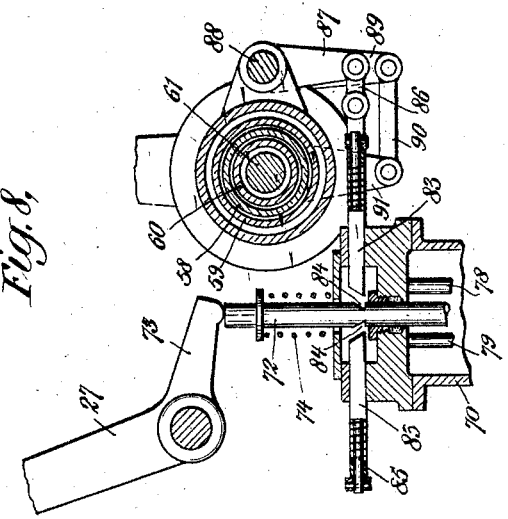
Fig. 8.
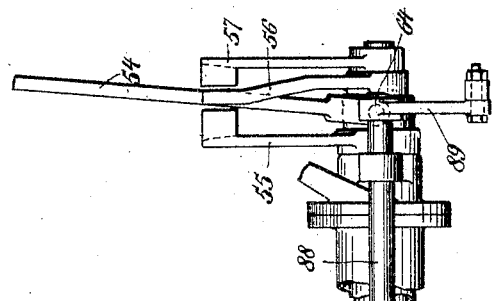
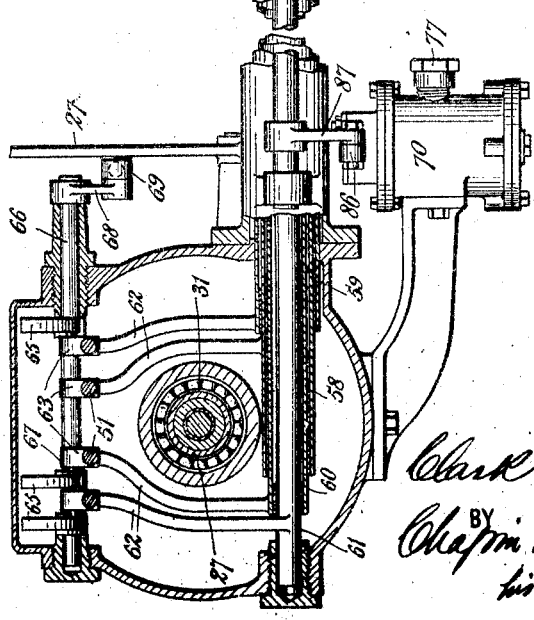
Fig. 6.
WITNESSES:
Ernest W. Seaholm
Lyman Andrews Jr.
INVENTOR
Clark W. Parker
BY
Chapin Rayford
his ATTORNEYS C. W. PARKER.
TRANSMISSION GEARING.
APPLICATION FILED JAN. 30, 1911.
1,042,960.
Patented Oct. 29, 1912.
6 SHEETS—SHEET 6.
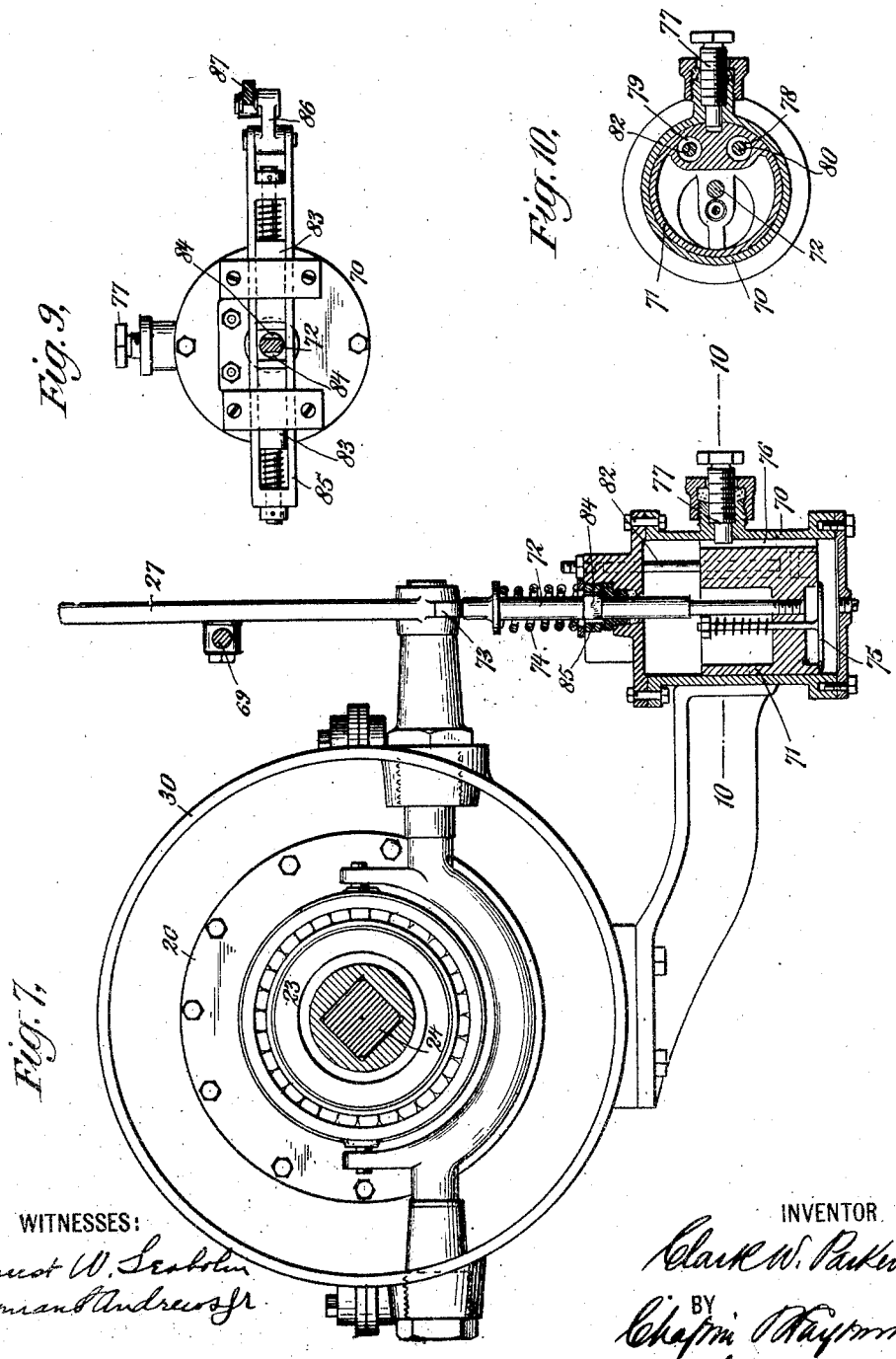

UNITED STATES PATENT OFFICE.

CLARK W. PARKER, OF SPRINGFIELD, MASSACHUSETTS, ASSIGNOR TO PARKER TRANSMISSION AND APPLIANCE COMPANY, OF SPRINGFIELD, MASSACHUSETTS, A CORPORATION OF MASSACHUSETTS.

TRANSMISSION-GEARING.

1,042,960.     Specification of Letters Patent.     Patented Oct. 29, 1912.

Application filed January 30, 1911. Serial No. 605,380.

*To all whom it may concern:*

Be it known that I, CLARK W. PARKER, a citizen of the United States of America, and a resident of Springfield, county of Hampden, and State of Massachusetts, have invented certain new and useful Improvements in Transmission-Gearing, of which the following is a specification, reference being had to the accompanying drawings, forming a part thereof.

My invention relates to the type of transmission gearing commonly employed in motor car construction wherein a main clutch is used for connecting the motor with a driving shaft, and change speed transmission gearing is employed between the driving shaft and the driven wheels of the vehicle, through which changes in relative speed and direction of drive may be accomplished. It is undesirable that the transmission gearing be operated to change the relative speed or direction of drive transmitted thereby under load conditions, and for this reason the main clutch or engine clutch, as it is commonly termed should, and in the best practice to-day must be released before the transmission gearing can be operated. The most common form of engine clutch employed at the present day is the multi-disk friction type, the clutch being commonly in a normally operated condition under the influence of a yielding spring, a foot pedal or other operating element being provided for releasing the clutch against the tension of such spring. The engine clutch is therefore released by depressing the pedal, for instance, and permitted again to engage by the release of the pedal, and where interlocking mechanism between the clutch operating means and the transmission gearing operating means is employed, the operation of disengaging the clutch acts to release the transmission gearing operating mechanism, which may then be operated, whereupon the clutch pedal may be again released to cause the reëngagement of the engine clutch.

In many types of transmission gearing and particularly in that type to which my present invention is peculiarly applicable, the operation of the transmission gearing controlling lever by which the changes in speed and direction of drive are finally accomplished, does not itself complete the adjustment of the parts, but yielding mechanism is interposed between the lever and the parts finally effected thereby by which certain intermediate parts are placed in position by the movement of the said lever, but other parts are allowed to complete their movements thereafter. In the completion of the movements of such other parts it is necessary that the movable parts of the gearing revolve to a certain extent and during this time it is desirable that the engine clutch be partly but not completely in engagement. A slipping connection is thereby provided sufficient to turn the movable parts of the transmission gearing slowly and without shock, and this slipping connection should continue for a period of time sufficient to complete the change speed or direction movement of the parts. In the mere use of the aforesaid interlocking mechanism however, after the transmission gearing controlling lever has been thrown to its final position, there is nothing to prevent a careless operator from releasing the pedal and thereby causing the immediate, full and complete engagement of the engine clutch.

In accordance with my present invention I provide means timed to the required movements of the transmission gearing parts to prevent the full and complete application of the engine clutch, until the shiftable transmission gearing parts have completed their movements for the aforesaid purpose. This means operates therefore, in conjunction with the interlocking means aforesaid, the latter preventing the movement of the transmission gearing controlling lever except when the pedal is depressed and the engine clutch released, and the former operating thereafter to prevent the complete application of the engine clutch after the clutch controlling lever has been moved to its final position and the engine clutch pedal has been released, until the shiftable transmission gearing parts have completed their necessary movements in a change speed or direction operation. The main engine clutch is operated however, under running conditions at other times than when the transmission gearing is to be operated, for instance, in driving through city streets the engine clutch pedal is often employed constantly to disengage or partially disengage the engine clutch so as to temporarily slow down the vehicle, the engine clutch being entirely disconnected on some occasions for the purpose of allowing the vehicle to move along under its own momentum only. Under these conditions it is undesirable that any retarding mechanism be employed because such retarding mechanism would interfere with the quick operation of the engine clutch, which under these conditions is often desirable, and to this end I have, in accordance with my present invention, provided a means by which the retarding mechanism is only employed when the transmission controlling mechanism is operated, the engine clutch being at other times entirely free to be manipulated at will under the control of the operator.

In carrying out my invention I employ many novel details of construction and combinations of parts such as will be fully pointed out hereinafter and other objects of my invention will also be apparent as resulting therefrom.

In order that my invention may be fully understood, I will now proceed to describe in detail a construction constituting an embodiment thereof, having reference to the accompanying drawings illustrating the same and will then point out the novel features in claims.

Figure 2:
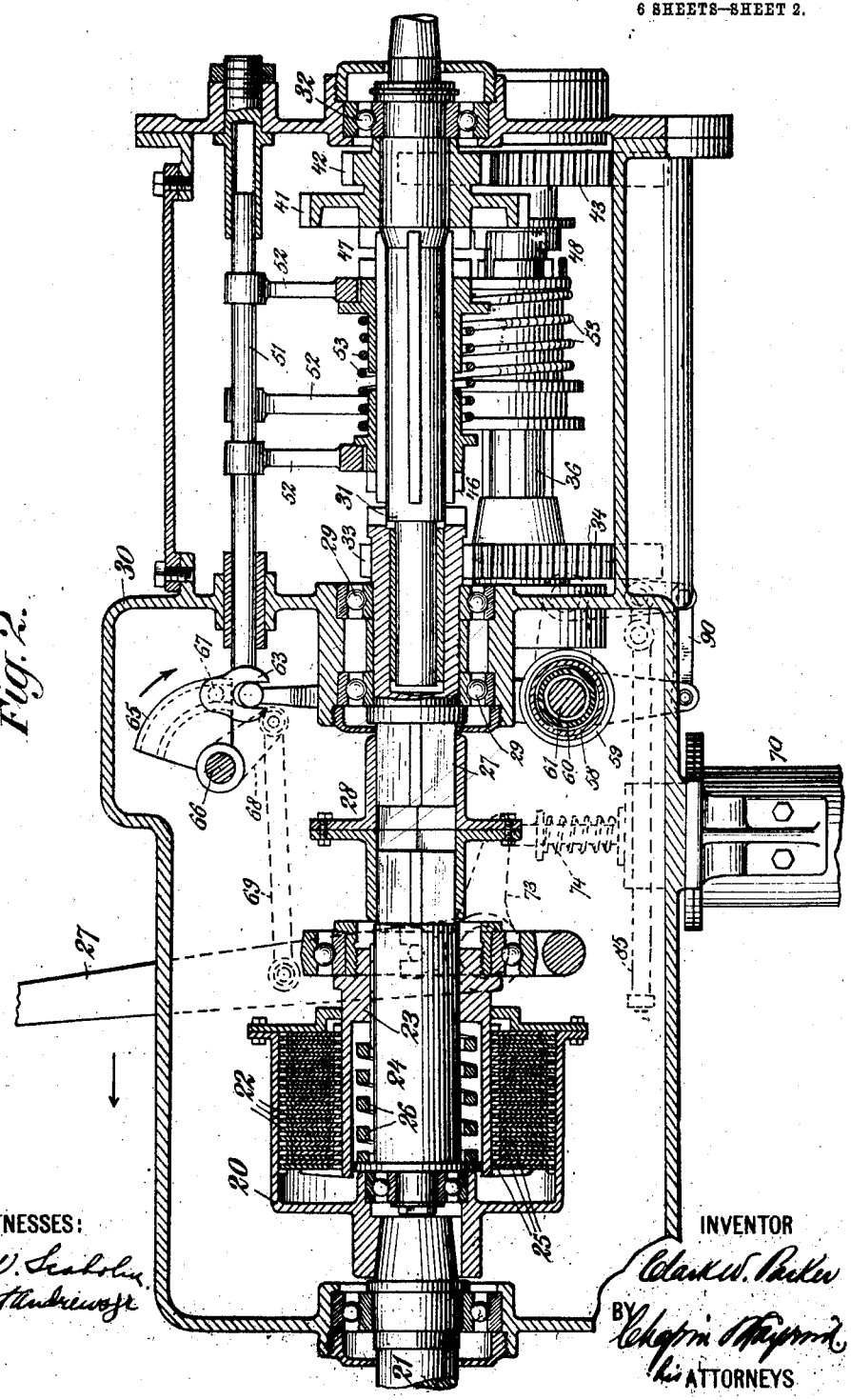

In the drawings: Figure 1 is a top view partly in horizontal section of transmission gearing and clutch mechanism constructed in accordance with my invention. Fig. 2 is a view in central vertical longitudinal section therethrough. Fig. 3 is a view in vertical longitudinal section through the transmission gearing proper, the plane of section being indicated by the line 3—3 in Fig. 1. Fig. 4 is a view in transverse vertical section through the transmission gearing on the plane of the line 4—4 in Fig. 1. Fig. 5 is a view in transverse vertical section through the transmission gearing on the plane of the line 5—5 in Fig. 1. Fig. 6 is a view in transverse vertical section through the transmission gearing on the plane of the line 6—6 in Fig. 1. Fig. 7 is a view in vertical transverse section through the engine clutch controlling mechanism, the plane of section being indicated by the line 7—7 in Fig. 1. Fig. 8 is a detail sectional view through the means by which the clutch retarding mechanism is rendered inoperative, except when the transmission gearing controlling lever is operated, the plane of section being indicated by the line 8—8 in Fig. 1. Fig. 9 is a top view of part of the mechanism shown in Fig. 8. Fig. 10 is a detail view in transverse section upon the line 10—10 in Fig. 7. Figs. 11, 12, 13, 14, and 15 are detail diagrammatic views showing the relationship of the liquid checking device parts in the various positions of the movable piston thereof. Fig. 16 is a diagrammatic view showing the relationship of the several gears and clutches employed in the transmission gearing.

As the engine clutch *per se* constitutes no part of my present invention I have merely illustrated in the drawings herewith a conventional form thereof in which a head 20, secured to the engine shaft 21 carries one set of clutch disks 22, and a hub 23 mounted to rotate with a driving shaft 24, but having a sliding movement thereon, carries another set of clutch disks 25. The head and hub are provided with oppositely disposed abutments in respective engagement with the end disks of the sets, and a powerful helical spring 26 tends to force the hub 23 in such direction as to cause the intimate engagement of the clutch disks, while an operating pedal 27 is provided for moving the hub 23 in the opposite direction, against the tension of the spring, to release the clutch disks from co-engagement.

The driving shaft in the construction shown is made in two parts, the part already designated by the reference character 24, and another part 27 in axial line therewith and connected thereto by a suitable coupling 28. The part 27 is arranged to rotate in suitable bearings 29 in the casing 30 as shown, and at its extremity is hollow and receives the forward end of a driven shaft 31, the rear end of which is supported in a bearing 32 in the casing 30. The transmission gearing is arranged between the driving shaft part 27 and the said driven shaft 31, the latter being arranged to be suitably connected through the usual intermediate mechanism with the driving wheels of the vehicle. The transmission gearing *per se* forms no part of my present invention and for a detail description and complete drawings thereof I refer to Letters Patent of the United States, Number 982,856, which were granted to me on the 31st day of January, 1911, and in which patent the said mechanism is specifically claimed. In general this mechanism is as follows, reference being particularly directed to Fig. 16 in which the relative arrangement of the gearing and clutches is shown in the form of a mechanical diagram, it being understood that the actual disposition of the shafts is more correctly shown in the constructional views Figs. 1 to 5 inclusive.

The driving shaft part 27 carries a pinion 33 arranged in constant mesh with spur gears 34 and 35 mounted respectively upon intermediate and low speed shafts 36—37. The low speed shaft 37 carries another gear wheel 38 which is arranged in constant mesh with a complementary gear wheel 39, mounted upon a reversing shaft 40. All of the said gear wheels are mounted fast upon their respective shafts, so that the three shafts 36, 37 and 40 are in constant driving relation with the shaft 27. Loosely mounted upon the driven shaft 31, but secured together, are two gear wheels 41—42, the latter being arranged in mesh with a gear wheel 43 loosely mounted upon the intermediate shaft 36, and the former with a gear wheel 44 loosely mounted upon the low speed shaft 37. The reversing shaft 40 has a gear wheel 45 loosely mounted thereon and arranged in mesh with the gear wheel 41 upon the driven shaft 31 (see Fig. 5, it being understood that for convenience of illustration the shaft 40 does not occupy its proper relative position with respect to the shaft 31 in Fig. 16). Referring again to Fig. 16, it will be seen that the mechanism includes five jaw clutches, a high speed clutch 46 between the driving and driven shafts, a driven shaft clutch 47 between the driven shaft 31 and the gear wheels 41—42, an intermediate clutch 48 between the intermediate shaft 36 and the gear wheel 43, a low speed clutch 49 between the low speed shaft 37 and the gear wheel 44, and a reversing clutch 50 between the reversing shaft 40 and the gear wheel 45. The various clutches have relatively stationary elements connected to or carried by the respective gear wheels, and relatively movable elements arranged to rotate with their respective shafts but constructed to have limited sliding movements thereon by which they may be operatively connected or disconnected with or from their respective relatively stationary elements. The operation of the high speed clutch connects the driving and driven shafts directly in high speed relation. The simultaneous operation of the driven and intermediate clutches connects the driving and driven shafts in driving relation through the gear wheels 33—34—43 and 42, but the driven shaft, while rotated in the same direction, is driven at a lower speed, herein termed an intermediate speed. Similarly low speed driving connection is effected through the gear wheels 33—35—44 and 41, by the simultaneous operation of the driven and low speed clutches 47—49, and reverse driving connection is effected through the gear wheels 33—35—38—39—45 and 41 by the simultaneous operation of the driven and reversing clutches 47—50. Longitudinally arranged shipper rods 51 are provided for operating the clutches, the same being connected by means of arms 52, through yielding springs 53 with the said movable clutch elements. The yielding springs will permit the shipper rods to be moved positively whether or not the jaw clutch elements are in the proper angular or rotative positions to co-engage, whereby their final movements of co-engagement may take place after the shipper rods have completed their movements.

The lever controlling mechanism by which the shipper rods are moved, as here shown (see particularly Fig. 6) comprises a main controlling lever 54 and operating arms 55, 56, 57. The said lever and arms are connected respectively with a set of four nested shafts 58—59—60—61, each of which is provided with an arm 62, the upper extremities of which engage heads 63, (see Fig. 3) carried by the forward ends of the respective shipper rods. The main lever is connected with the shipping rod which controls the movements of the movable clutch elements of the high speed and driven clutches 46 and 47, because one of these clutches is arranged to be operated whenever driving movements are to be transmitted at any speed or in either direction. The arms 55, 56 and 57 are connected with the other shipper rods, and any one of the said arms 55, 56 and 57 is adapted to be coupled with the main lever at will so that the intermediate, low speed or reversing clutches may be selectively operated with the driven shaft clutch at the will of the operator. For a specific and detail description and illustration of this form of controlling mechanism I refer to co-pending application, Serial No. 585,760 filed by me on October 7, 1910, in which the same is disclosed and claimed. In general each of the arms 55, 56 and 57 is provided with an upper forked extremity, and the main lever 54, in addition to being mounted to rotate with its shaft, is horizontally pivoted thereto as at 64, so that it will have a lateral rocking movement at right angles to the axis of rotation of its shaft, and in which movement it is adapted to be moved into and out of respective engagement with the forked ends of the several arms 55—56—57.

For the purpose of interlocking the transmission gearing clutch operating mechanism with the engine clutch operating mechanism, I have provided a set of quadrants 65 upon a rocking shaft 66, the said quadrants each having two lateral walls which provide three paths for a stud or projection 67 carried by each head 63 upon the shipping rods 51. Normally the stud or projection 67 is received between the two lateral walls as shown in Figs. 2 and 3, in which position it is impossible to move the shipping rods in either direction. The rock shaft 66 is connected by an arm 68 and a link 69 with the engine clutch pedal 27 (see particularly Figs. 1 and 2) whereby when the pedal is depressed to release the engine clutch the rock shaft will be rotated in the direction of the arrow in Fig. 2. When the pedal has been moved to a distance sufficient to entirely clear the clutch elements from frictional engagement, the quadrants 65 will have had an angular movement sufficient to release them from engagement with the pins or studs 67. The shipper rods are then free to be moved in either direction. When any shipper rod is moved in one direction or the other the stud 67 thereof will be moved to the exterior of one of the lateral walls of the quadrant so that on release of the pedal 27 and a consequent rearward movement thereof the stud 67 will be engaged by one or the other of the lateral walls of its quadrant 65, whereby it will be held and locked in its adjusted position until the pedal is again depressed.

By reference to Fig. 1 it will be noticed that I have actually provided only three locking quadrants while there are four shipper rods. As an economy in manufacture I do not provide the shipper rod directly connected with the main lever 54 with any locking quadrant because this lever when moving is always connected with one or another of the operating arms 55—56—57, and it is thus sufficient to provide for the locking of each of the other shipper rods. In other words, as the shipping rod directly connected with the lever 54 is never moved except when coupled with another shipping rod the provision of locking means for three of said shipping rods is sufficient to effect the locking of all four of the shipping rods.

By use of the foregoing interlocking mechanism it will be seen that the controlling lever mechanism for the transmission gearing can only be operated after the pedal lever has first been operated to release the engine clutch, and that the action of again engaging the engine clutch thereafter acts to again lock the shipper rods of the transmission gearing in their adjusted position from which they can only be moved by, and in consequence of, a later release of the engine clutch. After the controlling lever has been thrown to its adjusted position, however, it may be noted that as so far explained the release of the pedal 27 will immediately effect the reëngagement of the engine clutch. As the lever 54, however, may be thrown to its final position before the transmission gearing clutches have completed their engagement, such being possible by reason of the employment of the yielding springs as above described, it will follow that some means must be employed such as will prevent the reëngagement of the engine clutch elements prior to the completion of movements of the clutch elements of the transmission gearing even though the pedal 27 be released. In other words, the action of the engine clutch must be retarded and such retardation must be timed with respect to the time it takes the transmission gearing clutch elements to complete their movements. In the drawings herewith I have illustrated one embodiment of such retarding mechanism as follows: A vertically disposed liquid containing cylinder 70 is suitably carried by the casing 30, and a piston 71 is mounted therein, the piston rod 72 whereof extends upward through the upper head of the cylinder into free engagement with an arm 73 connected to move with the pedal 27. A spring 74 tends to move the piston upward, the relatively low tension of the spring 74 being opposed by the high tension of the engine clutch operating spring 26. In the normal running conditions with the engine clutch engaged the piston 71 is at or near the bottom of the cylinder 70. The piston 71 has a longitudinal channel therethrough which is closed by a puppet check valve 75. This check valve will open freely in the upward movement of the piston, permitting free passage of liquid from one end of the cylinder to the other, but closes to oppose the return movement. The piston 71 is provided with an external longitudinal groove 76 constituting a bypass through which the liquid may flow slowly when the piston 71 is moving downward and the check valve 75 is closed, a screw-threaded adjusting stud 77 being provided for adjusting the area of the said bypass, the extremity of the screw entering the channel 76 and likewise operating to prevent the piston from turning in the cylinder.

In addition to the main check valve closed passage through the piston and the restricted passage or by-pass just mentioned, the said piston is provided with two other longitudinally disposed channels 78—79, and fitted to these channels are stationary plungers 80—81—82, the plungers 80—81 being fitted to the channel 78 and the plunger 82 being fitted to the channel 79. The relative position of these plungers with respect to the piston 71 in its several movements is illustrated in Figs. 11 to 15 inclusive. In Fig. 11 the parts are shown when the piston is all the way down, and at this time the plungers 80—82 close the channels 78 and 79. When the pedal 27 is depressed to release the clutch the arm 73 moves upward and permits the piston 71 to move upward under the influence of the spring 74, the piston rod 72 following the movement of the arm 73, as will be well understood. The piston is permitted to move quickly to its uppermost position because during its upward movement the check valve 75 opens and there is an unrestricted passage for the liquid from one end of the cylinder to the other. In Fig. 12 the piston is shown in its uppermost position. The entire movement of the pedal necessary to unlock the transmission gear controlling mechanism, that is to say, the entire movement of the pedal necessary to swing the quadrants around to a position wherein the shipper rods 51 may be moved, is preferably quite a little greater than the amount necessary to fully release the engine clutch. This is for the reason that when desired the engine clutch may be released by a lesser movement of the pedal lever without thereby unlocking the transmission gearing mechanism. It is desirable, however, that the return movement of the pedal toward the reengagement of the clutch, be rapid while taking up lost motion of this overthrow movement, because while it is desirable to retard the complete application of the engine clutch, it is equally desirable to cause the quick engagement of the clutch in a yielding or slipping relation so that the shiftable clutch elements of the transmission gearing may be revolved following any operation of the controlling mechanism therefor. To this end I so adjust the plungers as to permit a free movement of the piston 71 and hence of the engine clutch operating mechanism, from the position in which the piston is shown in Fig. 12 to the position in which it is shown in Fig. 13, the liquid passing through the open channel 79 during this time. When the piston reaches the position shown in Fig. 13 the channel 79 will be closed by the plunger 82 and further movement of the piston will be retarded owing to the fact that the only channel for the liquid which must pass from beneath the piston to above it in the downward movement of the piston 71, is through the restricted by-pass channel 76. The moment the piston 71 reaches the relative position shown in Fig. 13 the engine clutch elements will have been adjusted to a position wherein the engine clutch will form a yielding or slipping connection between the engine and driving shafts, and the adjusting stud 77 must be so adjusted that the following movement of the piston will be retarded for a period of time sufficient for the transmission gearing clutch elements to complete their movements. Directly these movements have been surely completed the checking piston may, and preferably should, again move quickly for a period and until just prior to the final gripping operation of the engine clutch elements, it being understood that a considerable movement of the operating means of engine clutches of this description is necessary before the final gripping takes place owing to the fact that the slight movement required for a large number of disks is multiplied by such number of disks, and in the aggregate is considerable. During the aforesaid period of retardation the piston of the checking device will move from the position in which it is shown in Fig. 13 to that in which it is shown in Fig. 14, and at the moment it reaches the position shown in Fig. 14 the plunger 81 will leave the channel 78, thereby again permitting free passage of fluid through the piston which will permit the piston to have a free movement, or movement of acceleration, from this point to the point wherein the channel 78 is again closed by the plunger 80 as shown in Fig. 15. The accelerated movement of the piston occurs between the positions shown in Fig. 14 and that shown in Fig. 15, and thereafter the further and final downward movement of the piston will be again retarded. This second period of retardation will take place just as the final gripping of the engine clutch elements occurs so that such final gripping will take place quietly and without shock. Attention is directed to the fact that a liquid rather than air being used in the checking device, the substantial incompressibility of the same will cause the movements of the piston to take place in the proper predetermined times with relation to the movements of the other parts. The liquid employed is preferably a light oil.

It will be noted that the retarding mechanism just explained is not claimed herein *per se* as the same forms the subject matter of a copending application Serial Number 599,690, filed December 28, 1910.

In order to prevent the retarding mechanism from acting as such except when the engine clutch is operated immediately following a movement of the transmission gearing controlling mechanism, I have provided means as follows whereby the retarding means will be normally locked in an inoperative position. This means comprises two locking latches 83 (see particularly Figs. 8 and 9) arranged to slide into engagement with notches 84 in the piston rod 72 when the piston 71 is in its downward position. These latches are carried by a horizontally disposed frame 85 connected by a short link 86 with an arm 87 supported by a rock shaft 88 suitably located in proximity to the controlling means. This rock shaft 88 carries another arm 89 which is connected through a link 90 with an arm 91 secured to rotate with the shaft upon which the main controlling lever 54 is mounted. The parts are shown in Figs. 8 and 9 in their positions when the lever 54 is in its intermediate or neutral position, it being in such position when the transmission gearing clutches are all disconnected as is shown in Fig. 16. When, however, the lever 54 is thrown in either one direction or the other to connect any of the said clutches the connections just described from the shaft to the frame 85, will cause a movement of the frame 85 in one direction or the other, whereby to cause one or the other of the latches 83 to engage a notch 84 in the piston rod 72. This is the normal running condition of the parts and under such conditions it will be seen that the piston of the checking or retarding device will be held downward and not permitted to follow the movement of the arm 73 of the pedal 27 should the said pedal be depressed to release the engine clutch.

Thus when the transmission gear controlling mechanism is in its normal operated position the engine clutch may be operated freely independently of the retarding mechanism, which will not be permitted to coact therewith at such times.

It will be understood that in the movement of the transmission gearing controlling mechanism from one position to another, it is always necessary for the controlling lever to be first moved back to neutral; therefore, it will be seen that even though the retarding mechanism be normally locked in an inoperative position the necessary movement of the transmission gearing controlling mechanism will act to automatically release the retarding mechanism so that it will immediately come into operation to retard the reëngagement of the engine clutch following an operation of the transmission gearing controlling mechanism. As the transmission gearing controlling mechanism passes through the neutral position the piston rod 72 will be released and the piston will immediately fly upward under the influence of the spring 74 until the end of the piston rod reaches the arm 73. Thereafter as the transmission gearing controlling mechanism completes its movement and the frame 85 carrying the latches 83 moves to its final position in one direction or the other as viewed in Figs. 8 and 9, one or the other of the latches will be set in a position ready to reëngage one of the notches 84 when the piston and its rod are finally moved to their lowermost position. It is understood that the latches 83 are held in yielding relation in the frame 85 in order to permit a free movement of the frame when the piston rod is in positions other than that in which the notches 84 come opposite the latches 83 so that the latches will be ready to engage the notches when the piston rod does finally reach such position.

What I claim is:

1. Mechanism of the class described comprising an engine clutch and operating means therefor, transmission gearing, means for controlling the same to produce changes in the driving relation thereof, retarding means for controlling the application of the engine clutch, and means operated by the controlling means for the gearing for freeing the clutch of the retarding means when the gearing is in one of its operative or driving positions, substantially as and for the purpose described.

2. Mechanism of the class described comprising an engine clutch, and operating means therefor, transmission gearing and means for controlling the same to produce changes in the driving relation thereof, interlocking means between the operating means for the engine clutch and the controlling means for the transmission gearing, retarding means for controlling the application of the engine clutch, and means for freeing the clutch from the action of the retarding means after the gearing has been operated out of its neutral position, substantially as and for the purpose specified.

3. Mechanism of the class described, comprising an engine clutch, and operating means therefor, transmission gearing, and means for controlling the same to produce changes in the driving relation thereof, said latter means comprising spring pressed engaging parts capable of yielding during the operation of the controlling means into operative position and thus delaying the operative connection of the gearing with the engine clutch, interlocking means between the operating means for the engine clutch and the controlling means for the gearing, and means for retarding the application of the engine clutch until the spring pressed parts of the controlling means have assumed their operative position, substantially as and for the purpose set forth.

4. Mechanism of the class described comprising an engine clutch and operating means therefor, transmission gearing, and means for controlling the same to produce changes in the driving relation thereof, and retarding means timed to the required movements of the transmission gearing parts, in a driving relation change, to prevent the full and complete application of the engine clutch until the transmission gearing parts have completed their movements in such driving relation change.

5. Mechanism of the class described comprising an engine clutch and operating means therefor, transmission gearing, and means for controlling the same to produce changes in the driving relation thereof, and a liquid check retarding means timed to the required movements of the transmission gearing parts in a driving relation change, to prevent the full and complete application of the engine clutch until the transmission gearing parts have completed their movements in such driving relation change.

6. Mechanism of the class described comprising an engine clutch, and spring actuated means for causing the engagement thereof, transmission gearing, and means for controlling the same to produce changes in the driving relation thereof, means for preventing the operation of the controlling means until the clutch has been disengaged, means for retarding the action of the spring actuated means to reëngage the clutch, and means for freeing the clutch of the retarding means when the controlling means is operated to connect the transmission gearing in one of its driving relations, substantially as and for the purpose described.

7. Mechanism of the class described comprising an engine clutch and operating means therefor, transmission gearing and controlling means therefor arranged in its operation to produce changes in the driving relation of the transmission gearing, yielding means between the said controlling means and the parts operated thereby, whereby the controlling means may be moved to a final position and the parts thereafter caused to complete their movements by the said yielding means, and retarding means timed to the required movements of the said transmission gearing parts, to prevent the full and complete application of the engine clutch until the said transmission gearing parts have completed their movements in a driving relation change.

8. Mechanism of the class described comprising an engine clutch and operating means therefor, transmission gearing and controlling means therefor arranged in its operation to produce changes in the driving relation of the transmission gearing, yielding means between the said controlling means and the parts operated thereby, whereby the controlling means may be moved to a final position and the parts thereafter caused to complete their movements by the said yielding means, and a liquid check retarding means timed to the required movements of the said transmission gearing parts, to prevent the full and complete application of the engine clutch until the said transmission gearing parts have completed their movements in a driving relation change.

9. Mechanism of the class described comprising an engine clutch of the multi-disk type, spring-actuated means for forcing the disks into engagement, and a pedal for disengaging the said disks against the action of the spring, transmission gearing, means for controlling the same to produce changes in the driving relation thereof, means for preventing the operation of the said controlling means until the pedal has been operated to disengage the clutch, and a liquid check retarding means for retarding the action of the spring after the pedal has been released subsequent to an operation of the said controlling means.

10. Mechanism of the class described comprising an engine clutch and operating means therefor, transmission gearing and means for controlling the same to produce changes in the driving relation thereof, and means timed to the required movements of the transmission gearing parts in a driving relation change to retard the action of the said engine clutch operating means and for again permitting a free movement of such means after the transmission gearing parts have completed their movements in such driving relation change.

11. Mechanism of the class described comprising an engine clutch and operating means therefor, transmission gearing and means for controlling the same to produce changes in the driving relation thereof, a retarding means for the engine clutch operating means, arranged to retard the clutch engaging operation thereof only at times immediately subsequent to an operation of the transmission gearing.

12. Mechanism of the class described comprising an engine clutch and operating means therefor, transmission gearing and means for controlling the same to produce changes in the driving relation thereof, a retarding means for the engine clutch operating means, arranged to retard the clutch engaging operation thereof subsequent to an operation of the transmission gearing controlling means, and means for rendering the retarding means inoperative at times other than subsequent to the said operation of the transmission gearing controlling means.

13. Mechanism of the class described comprising an engine clutch and operating means therefor, transmission gearing and means for controlling the same to produce changes in the driving relation thereof, a retarding means for the engine clutch operating means arranged to retard the clutch engaging operation thereof, and means for normally holding the retarding means in an inoperative condition, and means operated by the transmission gearing controlling means in the movement thereof for releasing the said holding means, whereby the said retarding means will become operative after each operating movement of the said transmission gearing controlling means.

14. Mechanism of the class described comprising an engine clutch and operating means therefor, transmission gearing and means for controlling the same to produce changes in the driving relation thereof, a liquid check retarding means for the engine clutch operated means arranged to retard the clutch engaging operation thereof, means for normally holding the said liquid check retarding means in an inoperative condition, and means operated by the transmission gearing controlling means in the movement thereof for releasing the said holding means, whereby the said liquid check retarding means will become operative after each operating movement of the said transmission gearing controlling means.

15. Mechanism of the class described comprising an engine clutch and operating means therefor, transmission gearing and means for controlling the same to produce changes in the driving relation thereof, a retarding means for the engine clutch operating means arranged to retard the clutch engaging operation thereof, the said retarding means comprising a liquid containing cylinder, and a piston therein and having a check valve controlled passage for permitting free movement of the piston in one direction and a restricted by-pass for causing the piston to move slowly in the other direction, a spring for moving the piston in its free direction of movement, a latch for holding the piston at the end of the cylinder in a position wherein the said spring is compressed, and means for releasing the latch when the transmission gearing controlling means is moved.

CLARK W. PARKER.

Witnesses:
D. HOWARD HAYWOOD,
LYMAN S. ANDREWS, Jr.